July 31, 1956  F. S. SCHINDLER ET AL  2,756,804
TUBE CORRUGATING APPARATUS
Filed Oct. 21, 1950  2 Sheets-Sheet 1
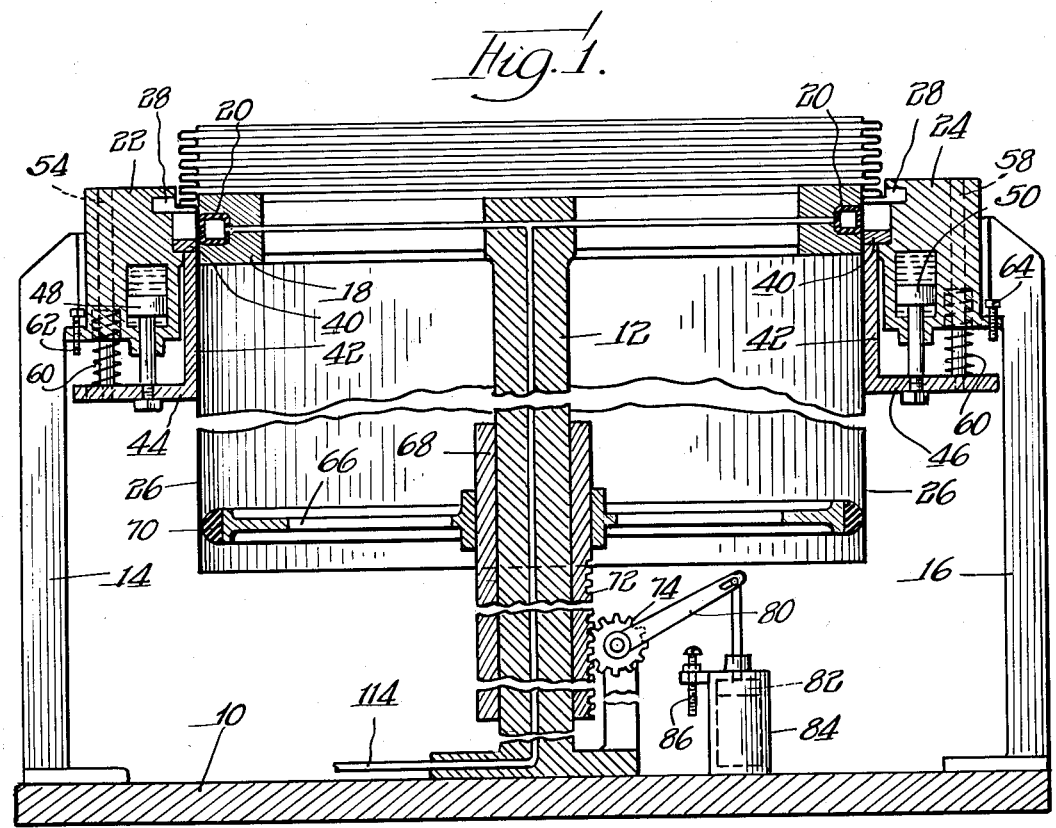
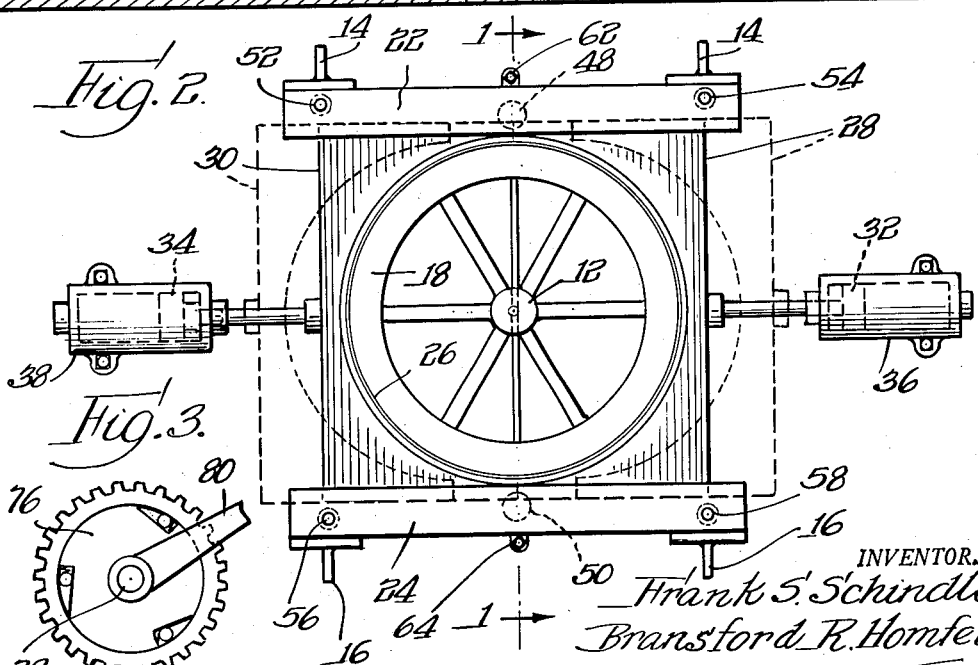
INVENTORS.
Frank S. Schindler
Bransford R. Homfeldt
By: Moore, Olson & Trexler attys.

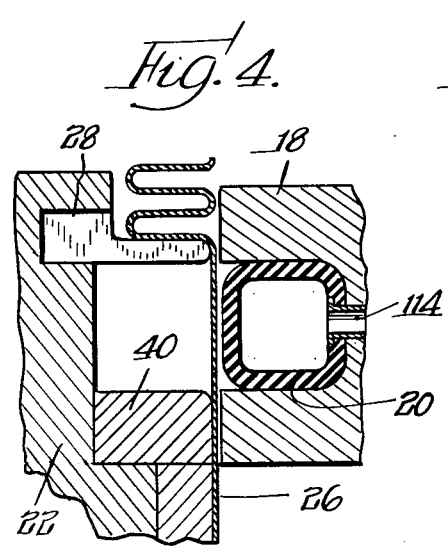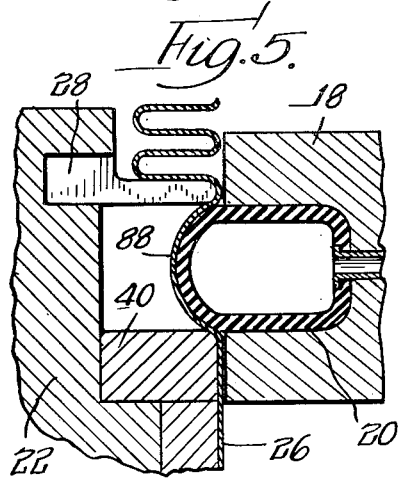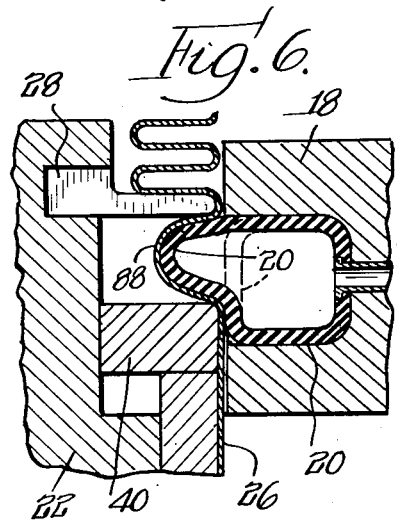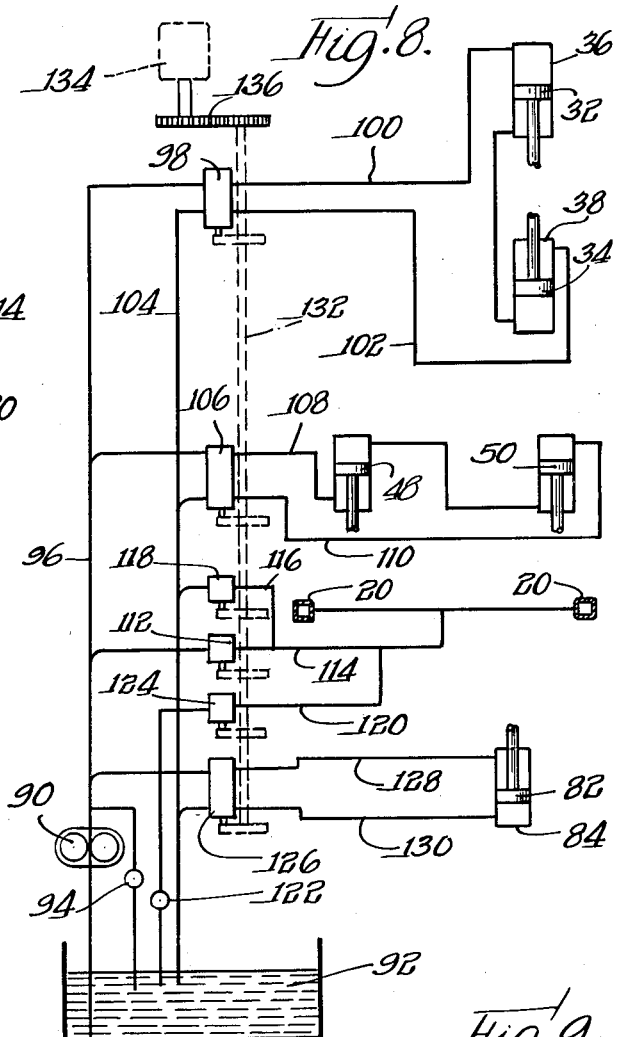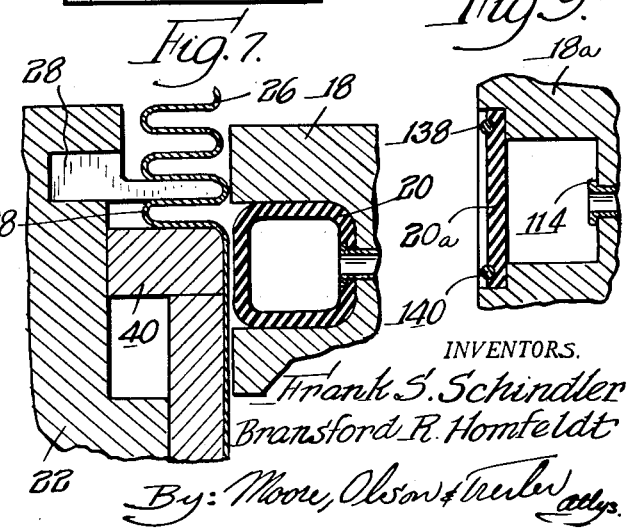

United States Patent Office

2,756,804
Patented July 31, 1956

2,756,804

TUBE CORRUGATING APPARATUS

Frank S. Schindler and Bransford R. Homfeldt, Elgin, Ill., assignors to Flexonics Corporation, a corporation of Illinois Application October 21, 1950, Serial No. 191,478

8 Claims. (Cl. 153—73)

This invention relates to tube corrugating apparatus, and concerns particularly means adapted for the corrugating of tubing of large diameter.

Apparatus and methods for corrugating tubing (sometimes referred to as bellows in shorter lengths, and as expansion joints in the larger sizes) as heretofore employed, are of various types. One type employs a plastic corrugating member, such for example as a rubber ring or the like; but difficulty is encountered in many instances in the use of such a device, due to difficulty in controlling the movements of the plastic member, and difficulties in fabrication, particularly in the larger sizes.

The formation of tube corrugations by hydraulic means is also known, in connection with apparatus and methods wherein the tube to be corrugated is filled with hydraulic fluid, while being embraced within die rings or plates spaced at desired intervals longitudinally of the tubing, and pressure then applied to the fluid to deform the tubing and effect the corrugating operation. This method has the difficulty that a plurality of die plates is required, and a very appreciable end thrust is imparted to the sealing means at the opposite ends of the tubing due to the application of hydraulic pressure, which, particularly in the instance of larger sizes, may become intolerable.

In accordance with the present invention, means for effecting tubing corrugations are employed, utilizing hydraulic principles, but wherein the foregoing, and other difficulties of conventional hydraulic tube forming methods and means are eliminated. Stated generally, the apparatus and means of the present invention employs a single hydraulically operated forming member, and associated single set of collapsing die plates, which may be used a plurality of times in any desired spacing sequence to produce multiple corrugations; and wherein further, the hydraulic pressure within the forming member may be controlled, during the die plate movement, so as to produce any desired cooperative action upon the tube strip, in accordance with the requirements of the particular application presented. The arrangement provides a materially reduced, or eliminated, hydraulic end thrust during the operation of the die plates, thus particularly adapting the apparatus and methods to the corrugation of tubing in large sizes.

It is an object of the present invention to provide improved means for effecting the corrugation of tubing or the like. More specifically stated, it is an object of the present invention to provide improved means for corrugating tubing, which may be used for corrugating tubing in larger sizes, and which employs hydraulic operation in an improved and controlled manner.

Further objects of the invention are to provide improved means for corrugating tubing, of the type heretofore set forth, which are more economical and efficient in operation, which are more rapid in operation, and which while employing hydraulic fluid may be easily sealed, and accurately controlled.

Various other objects, advantages and features of the invention will be apparent from the following specification when taken in connection with the accompanying drawings wherein certain preferred embodiments of the invention are set forth for purposes of illustration.

In the drawings, wherein like reference numbers refer to like parts throughout:

Fig. 1 is a general assembly view, somewhat diagrammatic in form, of a corrugating apparatus constructed in accordance with and embodying the principles of the present invention, the apparatus being shown in section along the line 1—1 of Fig. 2;

Fig. 2 is a plan view, partly in section, of the apparatus of Fig. 1, on a reduced scale;

Fig. 3 is an enlarged detail view, of a ball clutch device forming a part of the apparatus of Fig. 1;

Figs. 4, 5, 6 and 7 are sequential views, showing the detail of the hydraulic forming member and associated parts, in their sequential operation;

Fig. 8 is a schematic hydraulic diagram for the machine, and

Fig. 9 is a view showing a modified embodiment of hydraulic forming member.

As previously pointed out, the invention is particularly adapted for the corrugating of tubing of large diameter, such for example as used in the production of expansion joints and the like, and has been herein thus illustrated. It is to be understood, however, that the invention, in various of its aspects, is also adapted for use in corrugating tubing of all sizes, which in short lengths is sometimes referred to as bellows, as has been pointed out.

Referring more particularly to the drawings, and first to the embodiment illustrated in Figs. 1-8, in Fig. 1 the machine or apparatus illustrated comprises a main frame or base 10 having an upstanding support central pedestal 12 and pairs of oppositely disposed side support pedestals 14 and 16. The central support pedestal carries an annular platform 18 arranged to house the hydraulic forming member 20, the functioning of which will be hereinafter more particularly described. The side pedestals 14 and 16 support a pair of side frame brackets 22 and 24, respectively, which as will be seen in Fig. 2, are elongated and lie substantially within the plane of the platform 18. The platform 18 is arranged to be embraced by the tubing piece 26 to be formed, the tubing piece loosely embracing the platform and lying between the frame brackets 22 and 24.

The frame brackets 22 and 24 carry a pair of complemental die plates 28 and 30 horizontally slidable therein between a closed position as shown in full lines in Fig. 2, and an open position as illustrated in Fig. 2 by dotted lines. When the die plates are in closed position, the inner margins thereof form an annular lip loosely embracing the cylindrical tube 26, as will be understood, whereas when the die plates are separated or withdrawn to their dotted line positions, they become separated sufficiently so that the corrugated tubing may be longitudinally or vertically shifted. The means for shifting the die plates comprises a pair of pistons 32 and 34 secured thereto, and operable, respectively, within frame cylinders as indicated at 36 and 38.

An additional or cooperative die plate assembly is provided comprising an annular or ring die plate 40 carried at the upper end of the sleeve 42, the lower end of which is formed with a pair of flanges 44 and 46 lying beneath the frame brackets 22 and 24, respectively, and substantially commensurate in size therewith.

As shown in Figs. 1 and 2, means is provided for shifting the die assembly 40—46 vertically, which means comprises a pair of pistons 48 and 50 secured to the flanges 44 and 46, respectively, and operable in cylindrical chambers formed within the stationary frame brackets 22 and 24. A pair of upstanding guide pins 52 and 54 is carried by the flange 44, longitudinally slidable within the frame bracket 22, a similar guiding arrangement being provided for the flange 46 as indicated by the pins 56 and 58; there being compression springs 60 embracing each of the pins, normally operable to hold the shiftable die plate 40 in its lowermost position, as shown in Figs. 1 and 4. Adjustable stop screws 62 and 64 are provided, respectively, for abutment with the flanges 44 and 46, so as to limit the upward movement of the die ring or plate 40 to a predetermined limit.

The functioning of the die plates 28—30, and 40, in cooperation with the action of the hydraulic forming member 20, will be later more particularly described in reference to Figs. 4–7.

Means for holding and vertically shifting the tubing 26 is provided, which, as shown in Fig. 1, comprises an annular member 66 frictionally mounted upon a sleeve 68 which is in turn frictionally mounted upon the central upstanding support pedestal 12 of the frame. Member 66 carries an outer gripping ring 70, of rubber or the like, adapted to frictionally grip the tube 26. Sleeve 68 is formed with a rack portion 72 at its lower end cooperable with a gear 74. As best shown in Fig. 3, the gear 74 embraces a one-way ball clutch disc 76 mounted on a shaft 78 and secured to an arm 80, the arrangement being such that as the arm 80 and clutch disc 76 are shifted clockwise, corresponding clockwise rotation is imparted to gear 74, whereas counterclockwise movement of the arm 80 and clutch disc do not impart movement to the gear. Arm 80 is connected to a piston 82 operable within a frame cylinder 84, an adjustable stop pin 86 being provided for adjustably limiting the clockwise movement of the arm.

It will be seen that by reason of the connections provided, downward movement of piston 82 within the cylinder 84 will impart an upward shifting to sleeve 68 which in turn imparts an upward shifting to the annular gripping member 66 and the tube 26 to be formed, the amount of such upward shifting on each movement of the piston being determined by the adjustment of the stop pin 86. At the same time the tube 26 and associated gripping member 66 can be shifted independently of the sleeve 68 due to the frictional interconnection between the parts 66—68, as heretofore described.

The operation of the hydraulic forming member 20, in cooperation with the action of the die plates 28—30 and 40, will be best understood by reference to Figs. 4–7. The normal position of the parts is shown in Fig. 4. It will be seen that upon the application of hydraulic pressure to the forming member 20, the member is expanded as shown in Fig. 5 whereby to impress or project an annular corrugation 88 into the tubing 26 of predetermined magnitude and size, depending upon the size and position of the parts. Referring to Fig. 6, the annular die plate 40 may now be raised, to further collapse and form the convolution 88, in cooperation with the die plates 28—30; and during such collapsing or forming operation the annular forming member may either be collapsed and inactive, as shown in dotted lines in Fig. 6, or expanded under predetermined hydraulic pressure, as shown in full lines, by hydraulic control means presently to be described. The hydraulic forming member is thus enabled to cooperate with the die plates, as may be required, to impart a controlled action to the collapsing tubing convolution, thus providing an improved working and forming of the metal. In Fig. 7 the parts are shown in the positions assumed after the die plate 40 has been fully raised and the tubing convolution 88 fully formed in the tubing 26, and the hydraulic forming member 20 having been collapsed to normal position.

As will be understood, in the further operation of the parts, the die plate 40 is restored to normal lowered position and the split die plates 28—30 then retracted to their dotted line positions, as shown in Fig. 2. Thereafter the piston 82, Fig. 1, is actuated to impart an upward movement to the feeding member 66 of predetermined magnitude so as to bring a new tubing portion into position to be formed. Due to the frictional interconnection between the parts 66—68, the feeding member 66 is free to be drawn upwardly relative to the sleeve 68 during the projection of the forming member 20, and during the collapsing of the die plates, as heretofore described in reference to Figs. 4–7. In this connection it is to be noted that the frictional interengagement between the parts 66—68 may be relatively light, sufficient only to support the weight of the relatively light tubing 26. The frictional interconnection 66—68, and the frictional interengagement between the sleeve 68 and the support pedestal 12, permits the parts to be manually restored to position, at the end of the forming operation, to receive a new tubing piece 26 to be formed.

The hydraulic control circuit is shown in Fig. 8. A pump 90 draws fluid such as oil from a reservoir 92, there being a constantly open adjustable relief valve 94 by which the fluid is by-passed back to the reservoir from the pump, the adjustment of such relief valve thus determining the pressure within the pump outlet pressure supply line 96 of the system. A three-position four-way control valve is provided as indicated at 98 for controlling the introduction of the oil into the series connected operating cylinders 36 and 38 for operating the separable die plates 28—30. In one position the valve 98 is blocked. In its second position it directs fluid through line 100 to the upper end of the cylinder 36 from the pressure supply pipe 96, and directs the return fluid from line 102 to drain line 104. In the third position of the valve 98, the connections are reversed, the pressure supply fluid being directed from the line 96 to line 102, and the return fluid from line 100 to the drain line 104; the valve 98 thus being operable to lock the actuator pistons 32 and 34 from movement, or to propel them in opposite directions.

A similar valve 106 provides interconnection with the series connected actuator pistons 48 and 50, through lines 108 and 110; the valve thus being operable to block movement of the actuator pistons or to propel them in opposite directions, as will be understood.

A valve 112 having an "on" position and an "off" position, serves, when in on position to interconnect the pressure supply line 96 with a conduit 114 leading to the hydraulic forming member 20, and when in off position to block interconnection between the pipes 96 and 114 as will be understood.

A line 116 interconnects line 114 with the drain line 104 through a two-position on and off valve 118. When valve 118 is open free interconnection and drainage between the line 114 and the drain line 104 is provided.

A second drain line 120 is associated with the line 114, the drain line 120 communicating with the reservoir through an adjustable relief valve 122, and the flow therethrough being controlled by a two-position on and off valve 124. It will be seen that when valve 124 is open, while valves 112 and 118 are closed, the exhausting of fluid from the line 114 and from the forming member 20 will take place at the adjustable setting of the relief valve 122.

Thus by opening valve 118 the hydraulic forming member may be completely collapsed as shown in dotted lines in Fig. 6, during the compressing movement of the die plates 28—30 and 40; whereas by closing valves 112 and 118, and opening valve 124, the fluid may be retained within the forming member 20 during the die collapsing operation, as shown in solid lines in Fig. 6, and squeezed therefrom at any desired pressure determined by the setting of the adjustable relief valve 122.

The hydraulic control circuit further includes a three-position four-way control valve 126, similar to valves 98 and 106, having a blocking position, and two operating positions for directing fluid to and from the lines 128 and 130 to effect the reversible operation of the actuator piston 82.

Preferably the valves 98, 106, 118, 112, 124 and 126 may all be operated in predetermined timed sequence to effect the operations heretofore described, by means of a series of operating cams, diagrammatically illustrated in Fig. 8, and actuated by means of a cam shaft 132 driven from a motor 134 by means of gearing 136.

It will be seen that by means of the mechanisms disclosed, tubing, including the relatively larger sizes, may be corrugated by means of a single hydraulically operated forming member, and associated die plates, to effect corrugating operations in any desired spacing and group relationships. A single set of cooperable die plates, such for example as the die plates 28—30 and 40 may be employed to provide any number of corrugations in a tubing piece of different size, in any grouping and spaced relationship. Even when the collapsing of the die plates is effected while hydraulic pressure is maintained within the forming member 20, the end thrust resisting movement of the die plate 40 will be relatively small, as compared with an operation wherein the entire tubing piece might be subjected to hydraulic pressure over its entire end surface; or with hydraulic pressure relieved within the forming member 20, as indicated by dotted lines in Fig. 6, no end thrust due to the hydraulic pressure is encountered. By means of the control valves 122 and 124, as heretofore described, the hydraulic pressure within the forming member may be controlled over a wide range of pressures to impart a desired forming action to the tube wall during the collapse of the die plates, providing an accurate and desirable control for the metal during the collapsing operation in accordance with the requirements of a particular operation to be performed. The hydraulic pressure within the forming member 20 is sealed at all times, so that auxiliary sealing devices are not required; and there is no loss of the hydraulic fluid. The volume of the forming member 20 is low in respect to the movements thereof, whereby a maximum corrugating thrust is imparted by a minimum displacement of fluid within the conduit 114, facilitating rapid operation, and if desired, a dumping of the hydraulic fluid without excessive cost.

In Fig. 9 a modified embodiment of the hydraulic forming member is illustrated, such forming member in this instance comprising an annular cylindrical rubber band 20a, functionally corresponding to the hydraulic member 20, previously described, clamped to the annular support member 18a by a pair of clamping rings 138 and 140 so as to provide a fluid-tight annular forming member.

It is obvious that various changes may be made in the shape of the hydraulic forming member, and that various other specific changes may be made in the embodiments and structures of the invention as heretofore set forth, without departing from the spirit of the invention described. Accordingly, the invention is not to be limited to the specific structures set forth, but only as indicated in the following claims.

The invention is hereby claimed as follows:

1. Apparatus for making large diameter flexible corrugated tubing and comprising means for supporting a piece of tubing to be corrugated, a member of elastic plastic material engageable against a substantially annular wall section of the tubing at a corrugating station, means for conveying fluid under pressure from a fluid pressure source to said member and confining the fluid to produce radial projection of said member against the tubing wall section to produce an annular corrugation therein, cooperable die means engageable with the opposite side of the annular wall section of the tubing, means for moving said cooperable die means relatively together to effect collapse of the projected tubing wall section and the formation of a tubing corrugation, means for relieving the fluid transmitted to said member during collapsing of the projected tubing wall section, means for laterally shifting one of said cooperable die means out of engagement with the formed tubing corrugation to permit advance of the tubing corrugation past the said die means, and means for feeding the tubing longitudinally of its axis step by step in predetermined increments whereby to effect the corrugation of the tubing in predetermined increments longitudinally thereof.

2. Apparatus as claimed in claim 1, wherein there is provided a common fluid pressure control system for operating said die means and said member in predetermined time relation.

3. Apparatus as claimed in claim 1, wherein the member of elastic plastic material comprises a toroidal annulus.

4. Apparatus as claimed in claim 1, wherein the member of elastic plastic material comprises an annular band-like member.

5. Apparatus as claimed in claim 1, wherein there is provided a support for said member and wherein said support includes an annular recess in which the said member is mounted.

6. Apparatus as claimed in claim 5, wherein the member of elastic plastic material comprises a toroidal annulus normally housed in said recess.

7. Apparatus as claimed in claim 5, wherein the member of elastic plastic material comprises a band-like member closing the open end of said recess.

8. Apparatus as claimed in claim 1, wherein there is provided a support having an annular recess for the member of elastic plastic material, said recess opening toward the tubing; and wherein the cooperable die means move at least partially across the open end of the recess during their movement together to effect collapse of the tubing wall section.

References Cited in the file of this patent

UNITED STATES PATENTS

| | | |
|---|---|---|
| 349,718 | Hollerith et al. | Sept. 28, 1886 |
| 605,195 | Birtwisle | June 7, 1898 |
| 808,833 | Goltstein | Jan. 2, 1906 |
| 1,946,472 | Babcock | Feb. 13, 1934 |
| 2,083,763 | Ward | June 15, 1937 |
| 2,306,018 | Fentress | Dec. 22, 1942 |
| 2,423,862 | Vorobik | July 15, 1947 |
| 2,541,869 | Grant | Feb. 13, 1951 |
| 2,581,787 | Dreyer | Jan. 8, 1952 |

FOREIGN PATENTS

| | | |
|---|---|---|
| 7,299 | Great Britain | of 1896 |
| 333,104 | Great Britain | Aug. 7, 1930 |